US011129042B2

(12) United States Patent
Lev et al.

(10) Patent No.: US 11,129,042 B2
(45) Date of Patent: Sep. 21, 2021

(54) PATH CROSSING DETECTION BASED ON WIRELESS SIGNALS TRAVEL TIME

(71) Applicant: NEC Corporation Of America, Herzlia (IL)

(72) Inventors: Tsvi Lev, Tel-Aviv (IL); Yaacov Hoch, Ramat-Gan (IL); Liran Orevi, Rishon-LeZion (IL); Mark Vexler, Hod-HaSharon (IL)

(73) Assignee: NEC Corporation Of America, Herzlia (IL)

( * ) Notice: Subject to any disclaimer, the term of this patent is extended or adjusted under 35 U.S.C. 154(b) by 113 days.

(21) Appl. No.: 16/571,215

(22) Filed: Sep. 16, 2019

(65) Prior Publication Data

US 2021/0084514 A1   Mar. 18, 2021

(51) Int. Cl.
| | |
|---|---|
| *H04W 24/10* | (2009.01) |
| *H04W 24/08* | (2009.01) |
| *H04W 56/00* | (2009.01) |
| *H04W 40/20* | (2009.01) |
| *G08B 21/02* | (2006.01) |
| *G01S 5/00* | (2006.01) |

(Continued)

(52) U.S. Cl.
CPC ............. *H04W 24/10* (2013.01); *G01S 5/00* (2013.01); *G01S 13/04* (2013.01); *G08B 13/181* (2013.01); *G08B 21/02* (2013.01); *H04W 24/06* (2013.01); *H04W 24/08* (2013.01); *H04W 40/205* (2013.01); *H04W 56/009* (2013.01); *H04W 56/0045* (2013.01)

(58) Field of Classification Search
None
See application file for complete search history.

(56) References Cited

U.S. PATENT DOCUMENTS 4,551,722 A  *  11/1985  Tsuda .................... G01S 15/931
    340/901
5,062,088 A  *  10/1991  Davidson .............. G01S 15/931
    367/127

(Continued)

OTHER PUBLICATIONS

Dvorecki et al. "A Machine Learning Approach for Wi-Fi RTT Ranging", Proceedings of the 2019 International Technical Meeting of the Institute of Navigation, Reston, Virginia, USA, Jan. 28-31, 2019, p. 1-10, Jan. 28, 2019.

*Primary Examiner* — Fekadeselassie Girma (57) ABSTRACT

Presented herein are systems and methods for detecting a boundary line crossing based on Round Trip Time (RTT) measured for wireless signals transmitted between and initiator wireless transceiver and a responder wireless transceiver deployed to form a straight boundary line. The initiator wireless transceiver transmits wireless probe signal(s) to the responder wireless transceiver, receives a wireless response signal transmitted by the responder wireless transceiver in response to the wireless probe signal(s), calculates an RTT combining a travel time of the wireless probe signal(s) and the travel time of the wireless response signal(s), compares the RTT to a reference RTT computed for a wireless probe signal and a corresponding wireless response signal transmitted in a clear straight transmission path while the boundary line is clear of obstacles and determines whether an object is blocking the straight transmission path based on a deviation of the RTT from the reference RTT.

15 Claims, 7 Drawing Sheets

(51) Int. Cl.
  *H04W 24/06* (2009.01)
  *G08B 13/181* (2006.01)
  *G01S 13/04* (2006.01)

(56) References Cited

U.S. PATENT DOCUMENTS

| | | | | |
|---|---|---|---|---|
| 5,966,090 | A * | 10/1999 | McEwan | A61B 5/0507 340/541 |
| 6,633,254 | B1 * | 10/2003 | Sutphin | G01S 7/006 340/541 |
| 8,886,134 | B2 * | 11/2014 | Borlez | G01S 13/753 455/73 |
| 9,247,215 | B1 * | 1/2016 | Athan | G08B 13/1966 |
| 9,915,748 | B2 * | 3/2018 | Prance | G01V 3/088 |
| 10,706,696 | B1 * | 7/2020 | Pachikov | A01M 31/002 |
| 10,795,009 | B2 * | 10/2020 | Lien | G01S 13/34 |
| 2010/0079282 | A1 * | 4/2010 | Icove | G01K 11/006 340/561 |
| 2011/0181407 | A1 * | 7/2011 | Kole | G01S 17/46 340/435 |
| 2011/0221633 | A1 * | 9/2011 | Schramm | G01S 13/767 342/394 |
| 2013/0287011 | A1 * | 10/2013 | Zhao | H04W 4/90 370/338 |
| 2018/0239010 | A1 * | 8/2018 | Mindell | G01S 13/82 |
| 2019/0187266 | A1 * | 6/2019 | Yamanouchi | G01S 13/04 |
| 2019/0270455 | A1 * | 9/2019 | Woo | B60W 40/04 |
| 2020/0011986 | A1 * | 1/2020 | Yamanouchi | G01S 13/343 |
| 2020/0059635 | A1 * | 2/2020 | Katsumata | H04N 21/21805 |
| 2020/0380075 | A1 * | 12/2020 | Boada | G06F 40/216 |

* cited by examiner

PATH CROSSING DETECTION BASED ON WIRELESS SIGNALS TRAVEL TIME

FIELD AND BACKGROUND OF THE INVENTION

The present invention, in some embodiments thereof, relates to detecting crossing of boundary lines (paths), and, more specifically, but not exclusively, to detecting crossing of boundary lines based on wireless signals travel time measured by wireless transceivers.

Detecting objects crossing boundary lines may be a key element in a plurality of applications and systems. Such systems and application may include, for example, security and alarm systems deployed to detect intruders, people safety applications applied to detect people entering restricted and/or dangerous areas or exiting designated areas and/or the like. In another example, these systems and application may include monitor and control of automatic systems, for example, autonomous vehicles designed to operate within a certain area and/or the like.

Wireless networking, in particular Wireless Local Area Network (WLAN), for example, Wi-Fi plays a fundamental part in modern time communication. As such WLAN infrastructures and platforms are widely deployed in numerous locations ranging from home and office, via organizations and facilities to transportation vehicles, airports and smart cities.

Paving the way to harness the commonly deployed and widely available wireless network infrastructure devices and instrument them to support the boundary lines crossing detection applications may be therefore highly desirable.

SUMMARY OF THE INVENTION

According to a first aspect of the present invention there is provided a system for detecting a boundary line crossing of an object based on Round Trip Time (RTT) measured for wireless signals transmitted between two transceivers deployed to form the boundary, comprising:
  A responder wireless transceiver.
  An initiator wireless transceiver deployed to form a straight boundary line with the responder wireless transceiver. The initiator wireless transceiver is configured to:
    Transmit one or more wireless probe signals to the responder wireless transceiver.
    Receive a wireless response signal transmitted by the responder wireless transceiver in response to the wireless probe signal(s).
    Calculate an RTT combining a travel time of the wireless probe signal(s) and the travel time of the wireless response signal(s).
    Compare the RTT to a reference RTT computed for a wireless probe signal and a corresponding wireless response signal transmitted in a clear straight transmission path while the boundary line is clear of obstacles.
    Determine whether an object is blocking the straight transmission path based on a deviation of the RTT from the reference RTT.

According to a second aspect of the present invention there is provided a method of detecting a boundary line crossing of an object based on RTT measured for wireless signals transmitted between two transceivers deployed to form the boundary. The method comprising using one or more circuitries of an initiator wireless transceiver deployed to form a straight boundary line with a responder wireless transceiver, the circuitry(s) is configured to:
  Transmit one or more wireless probe signals to the responder wireless transceiver.
  Receive a wireless response signal transmitted by the responder wireless transceiver in response to the wireless probe signal(s).
  Calculate an RTT combining a travel time of the wireless probe signal(s) and the travel time of the wireless response signal.
  Compare the RTT to a reference RTT computed for a wireless probe signal and a corresponding wireless response signal transmitted in a clear straight transmission path while the boundary line is clear of obstacles.
  Determine whether an object is blocking the straight transmission path based on a deviation of the RTT from the reference RTT.

In an optional implementation form of the first, second, third and/or fourth aspects, one or more operations are initiated in case the straight transmission path is blocked. The operations comprise generating an alarm indication, transmitting a message to one or more access control systems and/or adjusting a transmission mode for transmitting one or more additional wireless probe signals.

In a further implementation form of the first, second, third and/or fourth aspects, the initiator wireless transceiver is configured to continuously transmit a plurality of wireless probe signals and receive corresponding wireless response signals in order to identify one or more objects crossing the boundary line and temporarily blocking the straight transmission path.

In an optional implementation form of the first, second, third and/or fourth aspects, a plurality of pairs of transceivers are deployed in a monitored space. Each of the plurality of transceiver pairs comprising an initiator wireless transceiver and a responder wireless transceiver deployed to form a respective straight boundary line in the monitored space.

In a further implementation form of the first, second, third and/or fourth aspects, the reference RTT is computed based on one or more calibration transmissions transmitted while the straight transmission path is clear of obstacles.

In a further implementation form of the first, second, third and/or fourth aspects, the reference RTT is computed based on a distance between the initiator wireless transceiver and the responder wireless transceiver, the distance is derived from a structural layout plan of a monitored space in which the initiator wireless transceiver and the responder wireless transceiver are deployed.

In a further implementation form of the first, second, third and/or fourth aspects, the reference RTT is computed based on a distance between the initiator wireless transceiver and the responder wireless transceiver, the distance is derived from geolocation information received from a geolocation sensor of the initiator wireless transceiver and a geolocation sensor of the responder wireless transceiver.

In a further implementation form of the first, second, third and/or fourth aspects, the initiator wireless transceiver is further configured to estimate one or more attributes of the blocking object according to permittivity of the blocking object estimated based on a value of the deviation.

In a further implementation form of the first, second, third and/or fourth aspects, the initiator wireless transceiver and the responder wireless transceiver are IEEE 802.11 transceivers configured to support RTT measurement as defined by IEEE 802.11-2016 specification.

In a further implementation form of the first, second, third and/or fourth aspects, the initiator wireless transceiver and the responder wireless transceiver are IEEE 802.11 Access Points (AP).

In a further implementation form of the first, second, third and/or fourth aspects, the wireless probe signal(s) and the corresponding wireless response signal are transmitted according to a Fine Timing Measurement (FTM) protocol according to the IEEE 802.11-2016 specification.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to detecting crossing of boundary lines (paths), and, more specifically, but not exclusively, to detecting crossing of boundary lines based on wireless signals travel time measured by standard wireless transceivers.

According to some embodiments of the present invention, there are provided methods, systems and computer program products for detecting an object crossing a boundary line defined by a Line of Sight (LOS) straight transmission path between the two wireless transceivers based on Round Trip Time (RTT) of wireless signals travelling between two wireless transceivers.

In particular, the wireless transceivers may be utilized by standard wireless network infrastructure devices, for example, Access Points (AP), wireless routers, wireless switches and/or any other wireless networking transceivers. Moreover, the standard wireless network infrastructure devices may include IEEE 802.11 Wireless Local Area Network (WLAN) devices, i.e., Wi-Fi devices which are highly common. In particular, the wireless transceivers may include Wi-Fi infrastructure devices supporting the IEEE 802.11-2016 specification defining the RTT and Fine Timing Measurement (FTM) protocols to support measurement of the RTT.

The detection of boundary crossing is based on computing the RTT for the wireless signals travelling between the two wireless transceivers compared to a reference RTT computed for wireless signals transmitted between the two wireless transceivers while the straight transmission path is clear of obstacles.

An object, for example, a person, an animal, a vehicle, an object carried by a person and/or the like crossing the boundary line may block the straight transmission path which coincides with the boundary line. The wireless signals exchanged between the two wireless transceivers which may be blocked by the blocking object may need to go through the blocking object and/or travel around the blocking object. Wireless signals travelling around the blocking object (bypass) may essentially travel longer transmission paths compared to the straight transmission path between the two wireless transceivers and the RTT computed for these bypass wireless signals may obviously increase compared to the reference RTT. Wireless signals travelling through the blocking object (through) may encounter one or more materials constructing the objet and may thus experience increased propagation time through the blocking object compared to propagation time via the air (or vacuum) as is for the clear straight transmission path. The RTT computed for these through wireless signals may therefore also increase compared to the reference RTT.

One of the wireless transceivers serving as an initiator wireless transceiver may transmit one or more wireless probe signals to the other wireless transceiver serving as a responder wireless transceiver. In response to each wireless probe signal, the responder wireless transceiver may transmit back to the initiator wireless transceiver a wireless response signal corresponding to the respective wireless probe signal.

Moreover, the initiator wireless transceiver and the responder wireless transceiver may exchange timing information relating to the wireless probe and response signals. In particular, the timing information may include the arrival time of each wireless probe signal at the responder wireless transceiver and the transmission time of the corresponding wireless response signal. The initiator wireless transceiver and the responder wireless transceiver may exchange the timing information using one or more wireless communication protocols. In particular, the wireless transceivers utilized by IEEE 802.11 devices supporting the IEEE 802.11-2016 specification may use the FTM protocol to exchange the timing information.

In order to associate each wireless response signal with its corresponding wireless probe signal, the initiator wireless transceiver may embed a unique identifier (ID) in each of the wireless probe signals. The responder wireless transceiver may embed the unique ID of each wireless probe signal in the corresponding wireless response signal transmitted in response to the respective wireless probe signal. The initiator wireless transceiver receiving the wireless response signals may extract the unique ID embedded in each wireless response signal to associate the respective wireless response signal with its corresponding wireless probe signal having the same ID.

The initiator wireless transceiver which may log the transmission time of each wireless probe signal and the arrival time of each wireless response signal at the initiator wireless transceiver may thus compute the cumulative (overall) travel time, i.e., the RTT of each wireless response signal and its corresponding wireless response signal.

The initiator wireless transceiver may then compare the computed RTT to the reference RTT. In case the computed RTT substantially equals the reference RTT within a predefined error margin, the initiator wireless transceiver may determine that the respective wireless probe signal and its corresponding wireless response signal have travelled along the straight transmission path which is thus estimated to be clear of objects. The initiator wireless transceiver may therefore determine that there was no crossing of the boundary line coinciding with the straight transmission path. However, in case the computed RTT deviates from the reference RTT, in particular exceeds the predefined error margin with respect to the reference RTT, the initiator wireless transceiver may determine that the respective wireless probe signal and its corresponding wireless response signal have been blocked by an object blocking the straight transmission path. In such case, the initiator wireless transceiver may determine that there is a potential crossing of the boundary line by one or more objects.

The reference RTT may be computed using one or more methods. For example, the initiator wireless transceiver and the responder wireless transceiver may execute one or more calibration transmissions while the straight transmission path is clear of obstacles. During the calibration transmission, the initiator wireless transceiver may transmit one or more wireless calibration probe signals to the responder wireless transceiver which responds with corresponding wireless calibration response signals. Based on the timing information relating to the wireless calibration signals which is exchanged between the initiator wireless transceiver and the responder wireless transceiver, the initiator wireless transceiver may compute the RTT for one or more pairs of wireless calibration probe and response signals and set the computed RTT as the reference RTT.

In another example, the reference RTT may be computed according to a distance between the initiator wireless transceiver and the responder wireless transceiver which is obviously the straight transmission path. After computing the distance, the reference RTT may be computed by dividing the distance by the speed of the wireless signals, i.e., the speed of light. The distance may be computed, for example based on location data extracted from a structural layout plan indicating the deployment location of the wireless transceivers. In another example, the distance may be computed based on the location of the wireless transceivers extracted from geolocation information received from one or more geolocation sensors of the wireless transceivers and exchanged between the wireless transceivers.

The RTT based detection of boundary crossing may be expanded to include a plurality of transceiver pairs each comprising an initiator wireless transceiver and a responder wireless transceiver deployed to form a plurality of boundary lines defined by the plurality of straight transmission paths (LOS) formed between the plurality of transceiver pairs. Moreover, a plurality of transceiver pairs may be deployed to detect a presence of an object at a certain monitored point, for example, a location of a safe, a location of a valuable art item, an entry point (e.g. door) to a facility, an entry point to an office and/or the like. The RTT based detection of boundary crossing may be applied for point presence detection by deploying multiple transceiver pairs such that the straight transmission paths formed between the plurality of transceiver pairs intersect at the monitored point. In such deployments, a simultaneous boundary crossing detected by multiple pairs at the same time may indicate a presence of an object at the monitored point.

Optionally, the initiator wireless transceiver identifies one or more attributes of one or more objects crossing the boundary line and thus blocking the straight transmission path according to permittivity of the blocking object estimated based on the value of deviation of the computed RTT from the reference RTT. Different materials, for example, organic materials, metals, synthetic materials, natural materials and/or the like may have different permittivity values which may inflict different propagation time of the wireless signals going through object(s) composed of these material(s). Based on the deviation of the computed RTT from the reference RTT, the initiator wireless transceiver may estimate the permittivity of the material(s) composing the blocking object(s) and may derive one or more of the attributes, for example, whether it is an organic object, a metal object and/or the like.

The RTT based boundary crossing detection may present major advantages and benefits compared to existing methods and systems for detecting boundary crossing.

First, using the standard Wi-Fi devices may significantly reduce the deployment effort and thus cost compared to other systems which may require deploying sensors and/or devices specifically directed to detecting crossing of boundary line(s). The wireless network infrastructure devices, specifically the Wi-Fi devices which are commonly deployed to provide Wi-Fi connectivity in a plurality of sites are thus already available in place (on site) and may be used for detecting crossing of the boundary line(s). The deployment of these Wi-Fi devices may be simply altered such that the straight transmission path (LOS) between each pair of Wi-Fi devices coincides (is congruent) with a respective boundary line which is desired to be monitored for crossing. It should be emphasized that the wireless network infrastructure devices require no change or adjustment to support the RTT based boundary crossing detection thus avoiding upgrade, replacement and/or deployment effort and/or cost.

Moreover, the RTT based boundary crossing detection may be significantly accurate compared to the other systems which may use sensors and/or devices which employ wide angle detection technologies, for example, Passive Infrared (PIR) sensors, acoustic sensors, Radio signals based sensors and/or the like and are thus incapable of accurately detecting the crossing of a significantly fine and narrow boundary line. Accurately monitoring a significantly narrow boundary line may prevent detection of objects which are in close proximity to the boundary line but do not cross it.

Furthermore, since the RTT based boundary crossing detection is based on RTT measurement of wireless signals, the wireless transceivers may be concealed from plain sight, for example behind partitions (e.g. curtains, wooden walls, plaster walls, etc.). This may serve for both aesthetic purposes as well as operational purposes since potential intruders may be unaware of the deployed wireless transceivers as opposed to the other systems which may require deployment of sensors which depend on clear view of the boundary line, for example, PIR sensors, acoustic sensors and/or the like.

In addition, the RTT based boundary crossing detection may enable estimating one or more of the attributes of the object(s) crossing the border line(s). Such capability may require specially designed and deployed sensors and/or devices as may be done by the other systems which may significant complicate the deployment of these systems and/or significantly increase costs of these systems. In contrast, the RTT based boundary crossing detection which is based on already deployed wireless network infrastructure devices may support this capability with no additional costs.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
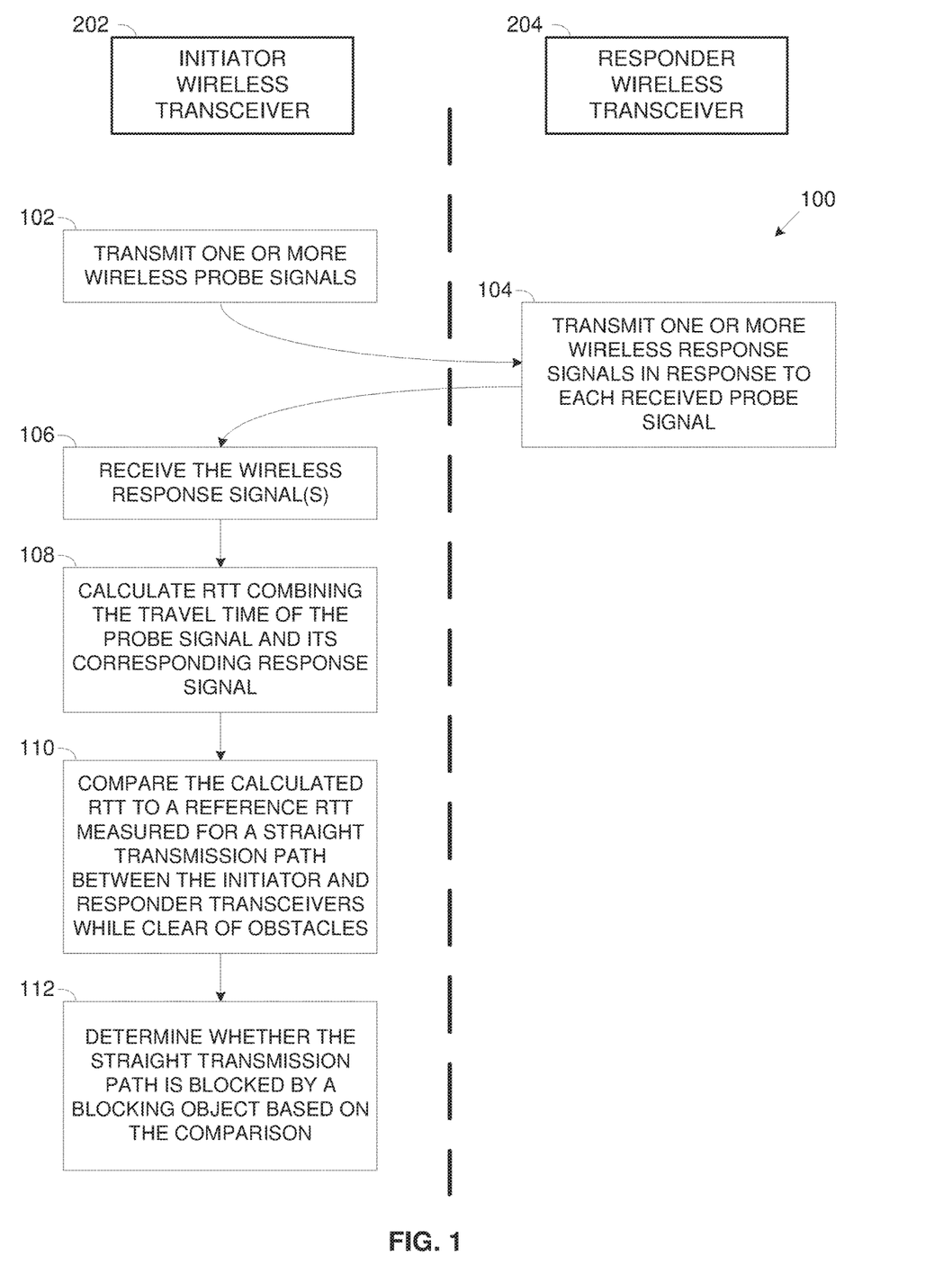
FIG. 1 is a flowchart of an exemplary process of detecting crossing of a boundary line based on wireless signals travel time measured by wireless transceivers, according to some embodiments of the present invention.

Referring now to the drawings, FIG. 1 is a flowchart of an exemplary process of detecting crossing of a boundary line based on wireless signals travel time measured by wireless transceivers, according to some embodiments of the present invention. An exemplary process 100 may be executed by a first wireless transceiver (initiator) 202 and a second wireless transceiver (responder) 204 to detect an object crossing a straight boundary line defined by a Line of Sight (LOS) between the two wireless transceivers 202 and 204 based on travel time of wireless signals transmitted between the two wireless transceivers 202 and 204. In particular, the initiator wireless transceiver 202 may determine whether an object is crossing the boundary line and thus blocks the straight transmission path (LOS) by detecting a deviation of the wireless signals travel time compared to a reference travel time computed for wireless signals transmitted between the two wireless transceivers 202 and 204 while the straight transmission path is clear of obstacles.

Figure 2:
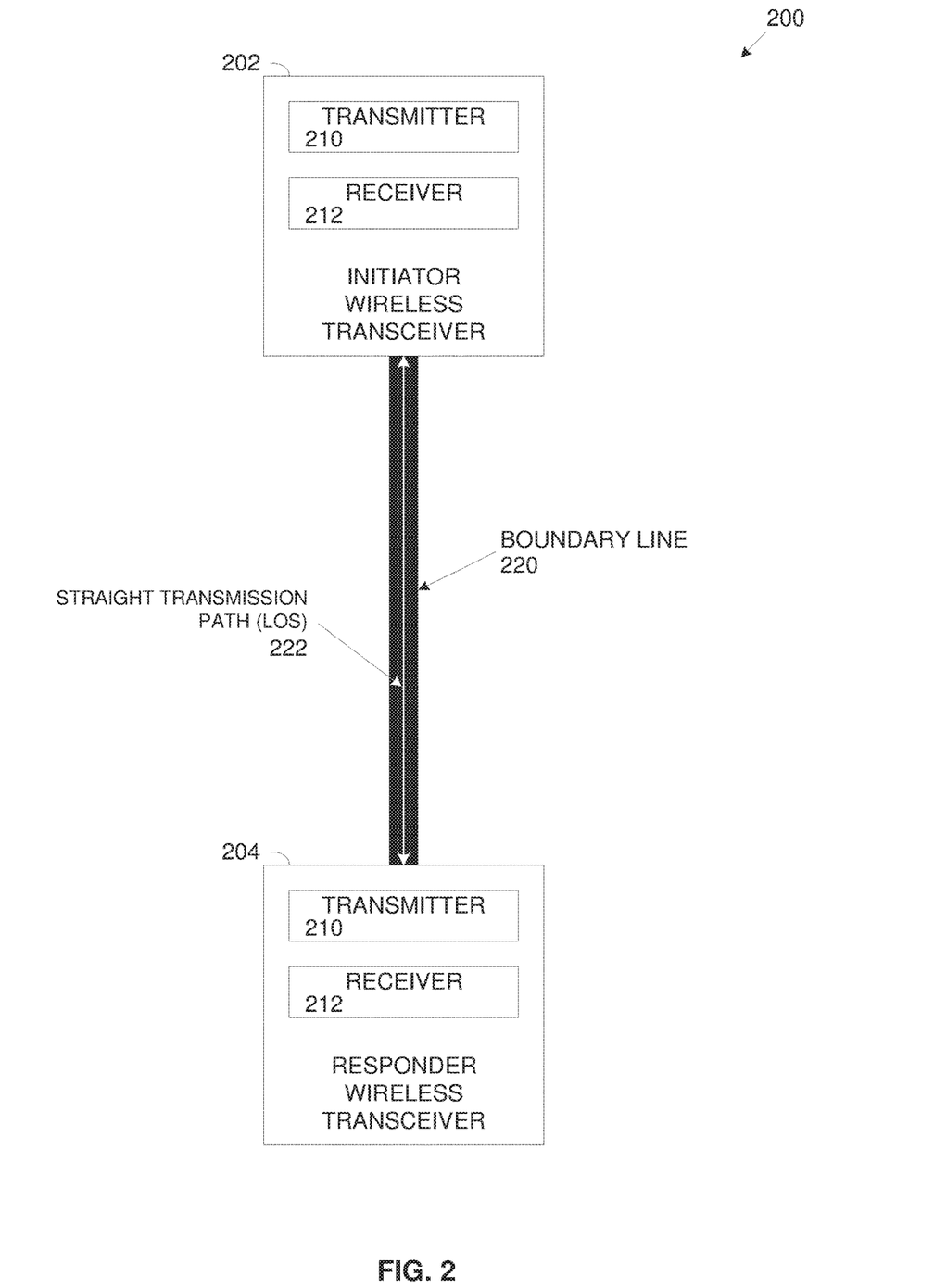
FIG. 2 is a schematic illustration of an exemplary monitored space deployed with wireless transceivers for detecting crossing of a boundary line based on wireless signals travel time measured by wireless transceivers, according to some embodiments of the present invention.

Reference is also made to FIG. 2, which is a schematic illustration of an exemplary monitored space deployed with wireless transceivers for detecting crossing of a boundary line based on wireless signals travel time measured by wireless transceivers, according to some embodiments of the present invention. An exemplary monitored space 200, for example, a room, an office, a building, a facility and/or the like may be deployed with the first wireless transceiver 202 operating as an initiator and the second wireless transceiver 204 operating as a responder.

The initiator wireless transceiver 202 and the responder wireless transceiver 204 are deployed in the monitored space 200 to form a boundary line 220 which is a straight line between the two wireless transceivers 202 and 204 congruent to the LOS between the two wireless transceivers 202 and 204.

A straight transmission path 222 of wireless signals transmitted between the two wireless transceivers 202 and 204 also coincides with the LOS between the wireless transceivers 202 and 204 and thus the straight transmission path 222 is congruous with the boundary line 220. The straight transmission path 222 may naturally be the shortest transmission path thus signals transmitted between the wireless transceivers 202 and 204 may have a shortest travel time to reach from one wireless transceiver to the other.

The wireless transceivers 202 and 204 may include wireless network equipment, in particular, standard wireless network infrastructure equipment, for example, Access Points (AP), wireless routers, wireless switches and/or any other wireless networking devices.

The wireless transceivers 202 and 204 may support one or more industry standard wireless communication protocols and/or proprietary wireless protocols which support measurement of travel time between the wireless transceivers 202 and 204. In particular, the wireless transceivers 202 and 204 may employ wireless protocols supporting the measurement of wireless signals Round Trip Time (RTT). The RTT is the combined time of a travel time of a wireless signal going from one wireless transceiver to another wireless transceiver and the travel time of a response wireless signal going back to the first wireless transceiver.

For example, the wireless transceivers 202 and 204 may employ the Wireless Local Area Network (WLAN) Wi-Fi protocol according to the IEEE 802.11 specification, in particular the IEEE 802.11-2016 specification defining RTT and Fine Timing Measurement (FTM) protocols to support measurement of the RTT. As such the wireless transceivers 202 and 204 may include, for example, APs, routers, switches and/or any other wireless networking devices supporting the IEEE 802.11-2016 specification.

Each of the wireless transceivers 202 and 204 may include a transmitter 210 configured to transmit wireless signals according to the wireless communication protocols used by the wireless transceivers 202 and 204 and a receiver 212 configured to receive (intercept) wireless signals transmitted according to these wireless communication protocols.

The wireless transceivers 202 and/or 204 may include one or more hardware elements, for example, a circuit, a component, an Integrated Circuit (IC), an Application Specific Integrated Circuit (ASIC), a Field Programmable Gate Array (FPGA), a Digital Signals Processor (DSP), a network processor and/or the like. The wireless transceivers 202 and/or 204 may further include one or more processors and memory resources for program store and/or data store for executing one or more software modules. Each of the software modules, for example, a process, an application, an agent, a utility, a tool, a script and/or the like comprises a plurality of program instructions which may be executed by the processor(s) from the program store memory.

The wireless transceivers 202 and/or 204 may therefore execute, implement and/or facilitate the process 100 using one or more of the hardware elements, one or more software modules and/or a combination thereof.

As shown at 102, the initiator wireless transceiver 202 may transmit one or more wireless probe signals to the responder wireless transceiver 204.

The initiator wireless transceiver 202 may continuously transmit wireless probe signals to constantly monitor the boundary line for crossing object(s) according to one or more transmission rules. For example, the initiator wireless transceiver 202 may transmit the wireless probe signals constantly one after the other. In another example, the initiator wireless transceiver 202 may transmit the wireless probe signals every predefined time period, for example, half second, one second, two seconds, five seconds and/or the like.

Moreover, in order to uniquely identify each of the transmitted wireless probe signals, the initiator wireless transceiver 202 may assign to each of the wireless probe signals a unique identifier (ID) embedded in each respective wireless probe signal.

As shown at 104, the responder wireless transceiver 204 may transmit a wireless response signal in response to each wireless probe signal received from the initiator wireless transceiver 202.

Moreover, the responder wireless transceiver 204 may associate each wireless response signal with its corresponding wireless probe signal by embedding the ID of the corresponding wireless probe signal in the respective wireless response signal transmitted in response to the corresponding wireless probe signal.

As shown at 106, the initiator wireless transceiver 202 may receive the wireless response signal(s) transmitted by the responder wireless transceiver 204 in response to one or more of the wireless probe signal(s).

The initiator wireless transceiver 202 may further associate each received wireless response signal with its corresponding wireless probe signal according to the ID embedded in the received wireless response signal.

As shown at 108, the initiator wireless transceiver 202 may calculate the RTT for each wireless probe signal and its corresponding wireless response signal.

In order to compute the RTT, the initiator wireless transceiver 202 may communicate with the responder wireless transceiver 204 to acquire timing information relating to one or more of the probe signal(s) and their corresponding wireless response signals. The initiator wireless transceiver 202 and the responder wireless transceiver 204 may apply one or more methods, techniques and/or protocols for exchanging timing information required for the initiator wireless transceiver 202 to compute the RTT for each pair of wireless probe signal and its corresponding wireless response signal.

For example, assuming the initiator wireless transceiver 202 and the responder wireless transceiver 204 support and operate according to the IEEE 802.11-2016 specification supporting the FTM protocol. In such case the initiator wireless transceiver 202 and the responder wireless transceiver 204 may exchange one or more messages according to the FTM protocol to acquire and provide the timing information.

Figure 3:
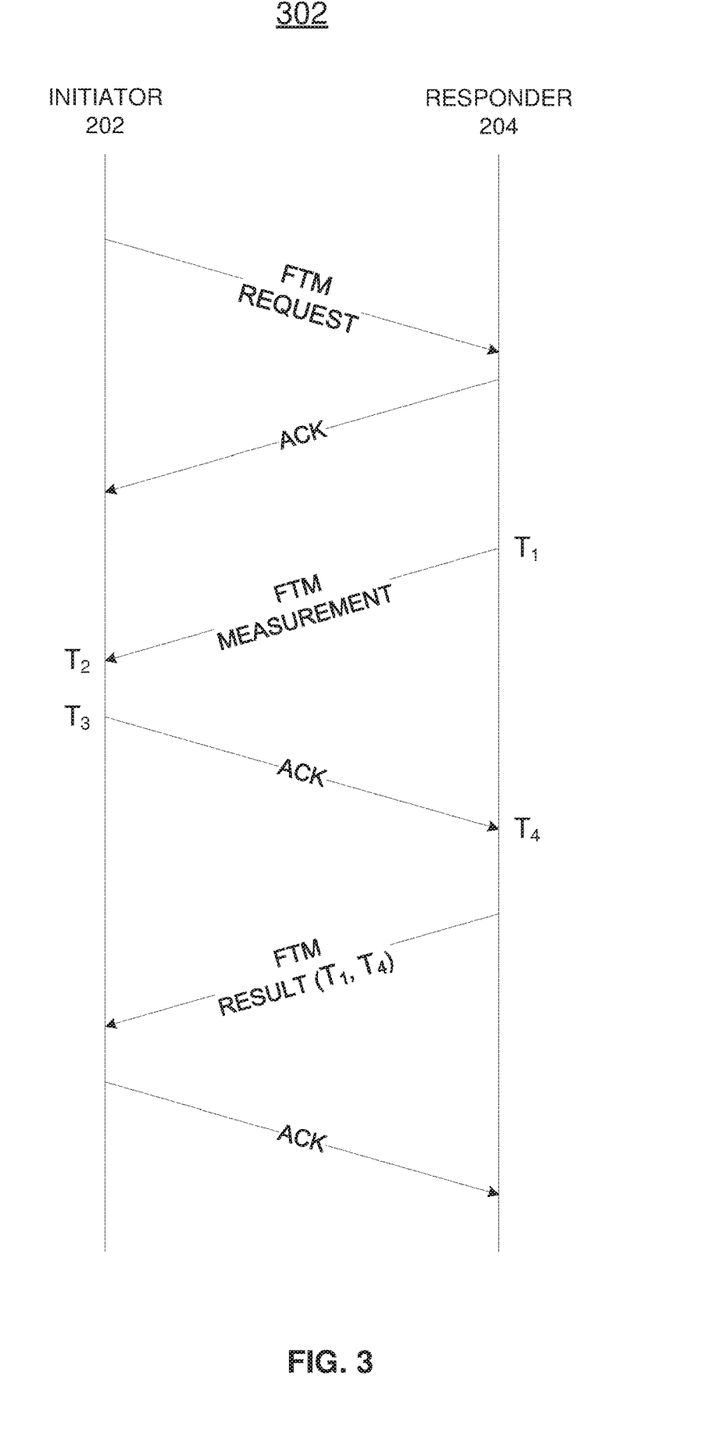
FIG. 3 is a schematic illustration of an exemplary signal propagation timing measured using Fine Timing Protocol (FTM) for exchanging travel time information between wireless transceivers.

Reference is now made to FIG. 3, which is a schematic illustration of an exemplary signal propagation timing measured using FTM for exchanging travel time information between wireless transceivers such as the initiator wireless transceiver 202 and the responder wireless transceiver 204. An exemplary handshake sequence 302 presents a message (signal) exchange between the initiator wireless transceiver 202 and the responder wireless transceiver 204 according to the FTM protocol as known in the art. The initiator wireless transceiver 202 may exchange FTM messages with the responder wireless transceiver 204 to obtain timing information required to compute the RTT of a wireless probe signal and its corresponding wireless response signal.

The initiator wireless transceiver 202 may initially transmit an FTM request message to the responder wireless transceiver 204.

The responder wireless transceiver 204 may respond to the FTM request with an acknowledge message (ACK). At time $T_1$ the responder wireless transceiver 204 may transmit an FTM measurement message to the initiator wireless transceiver 202. The time between the reception of the request message and the time ($T_1$) of transmission of the FTM measurement message by the responder wireless transceiver 204 may be defined by the FTM protocol and is typically less than 10 ms (milliseconds).

The initiator wireless transceiver 202 receives the FTM measurement message at time $T_2$, and in response transmits at time $T_3$ an acknowledge message (ACK) which is received by the responder wireless transceiver 204 at time $T_4$.

The responder wireless transceiver 204 may then transmit an FTM result message comprising the timing information logged by the responder wireless transceiver 204 for the FTM measurement message, in particular, the time $T_1$ of transmission of the FTM measurement message and the time $T_4$ of reception of the acknowledge message transmitted by the initiator wireless transceiver 202 in response to the FTM measurement message.

After receiving the FTM result message comprising the times $T_1$ and $T_4$, the initiator wireless transceiver 202 which locally logged the times $T_2$ and $T_3$ has all the timing information required for computing the RTT for the FTM measurement message serving as the wireless probe signal and the corresponding acknowledge message serving as the corresponding wireless response signal.

The initiator wireless transceiver 202 may compute the RTT according to equation 1 below.

$$RTT=(T_2-T_1)+(T_4-T_3) \qquad \text{Equation 1:}$$

As shown at 110, the initiator wireless transceiver 202 may compare the RTT computed for each wireless probe signal and its corresponding wireless response signal to a reference RTT computed in advance for the boundary line 220, in particular for the straight transmission path 222.

The reference RTT may be computed by the initiator wireless transceiver 202 for wireless signals travelling in the straight transmission path 222 coinciding with the boundary line 220 while the straight transmission path 222 is clear of obstacles. The straight transmission path 222 is obviously the shortest transmission path between the initiator wireless transceiver 202 and the responder wireless transceiver 204. The travel time of wireless signals traveling the straight transmission path 222 may therefore be the shortest travel time. The reference RTT is therefore the lowest RTT compared to the RTT of all probe and corresponding response wireless signals traveling between the initiator wireless transceiver 202 and the responder wireless transceiver 204 along transmission paths other than the straight transmission path 222.

The reference RTT may be computed using one or more methods.

For example, the initiator wireless transceiver 202 and the responder wireless transceiver 204 may execute one or more calibration transmissions according to the process 100, in particular, according to steps 102 through 110 of the process 100. The initiator wireless transceiver 202 may transmit one or more wireless calibration probe signals to the responder wireless transceiver 204 as described in step 102 while the straight transmission path 222 is clear of obstacles. In response to each wireless calibration probe signal, the responder wireless transceiver 204 may transmit a corresponding wireless calibration response signal as described in step 104, again while the straight transmission path 222 is clear of obstacles.

Since the straight transmission path 222 is clear, the wireless calibration probe and response signals may travel along the straight transmission path 222 between the initiator wireless transceiver 202 and the responder wireless transceiver 204. It is possible that the monitored space 200 is an indoor environment, an urban environment and/or the like. In such case, the wireless calibration probe and/or response signals may exhibit multipath transmission in which the wireless calibration signal(s) may travel along multiple paths between the initiator wireless transceiver 202 and the responder wireless transceiver 204 due to reflections and/or deflections from objects located in the monitored space 200, for example, walls, furniture, vehicles and/or the like. However, in such multipath environments, the wireless calibration probe signal(s) travelling along the straight transmission path 222 which is the shortest transmission path may be the first to reach the responder wireless transceiver 204 among all wireless calibration probe signal(s) travelling the multiple transmission paths. The initiator wireless transceiver 202 and the responder wireless transceiver 204 may therefore use the first arriving wireless calibration probe and response signals for computing the reference RTT.

In another example, the reference RTT may be computed according to a distance between the initiator wireless transceiver 202 and the responder wireless transceiver 204 which is obviously the straight transmission path 222. After computing the distance between the initiator wireless transceiver 202 and the responder wireless transceiver 204, the reference RTT may be computed by dividing the derived distance by the speed of the wireless signals, i.e., the speed of light.

The distance between the initiator wireless transceiver 202 and the responder wireless transceiver 204 may be computed using one or more methods. For example, the location of the initiator wireless transceiver 202 and the responder wireless transceiver 204 may be extracted from a structural layout plan of a monitored space 200 indicating the deployment location of the initiator wireless transceiver 202 and the responder wireless transceiver 204. The distance of between the initiator wireless transceiver 202 and the responder wireless transceiver 204 may be computed based on the locations of the initiator wireless transceiver 202 and the responder wireless transceiver 204. In another example, the location of the initiator wireless transceiver 202 and the responder wireless transceiver 204 may be extracted from geolocation information received from one or more geolocation sensors of the initiator wireless transceiver 202 and one or more geolocation sensors of the responder wireless transceiver 204. The distance between the initiator wireless transceiver 202 and the responder wireless transceiver 204 may be computed according to the spatial location (planar and altitude) of the initiator wireless transceiver 202 and the responder wireless transceiver 204.

As shown at 112, the initiator wireless transceiver 202 may determine whether an object is blocking the boundary line 220 formed by the straight transmission path 222 according to a deviation of the RTT computed for one or more of the wireless probe signals and their corresponding wireless response signals with respect to the reference RTT.

In case the computed RTT deviates from the reference RTT by a time value which is within a predefined small error margin, for example, 5% of the overall RTT, the initiator wireless transceiver 202 may determine that the deviation is insignificant which may be indicative that the straight transmission path 222 is clear. The initiator wireless transceiver 202 may therefore determine and/or estimate that no object is blocking the straight transmission path 222 thus no object crosses the boundary line 220.

However, in case the deviation of the computed RTT from the reference RTT exceeds the predefined error margin, the initiator wireless transceiver 202 may determine that the deviation is significant which may be indicative that the straight transmission path 222 is blocked. The initiator wireless transceiver 202 may therefore determine and/or estimate that one or more objects are blocking the straight transmission path 222 thus one or more objects may be crossing the boundary line 220.

Figure 4A:
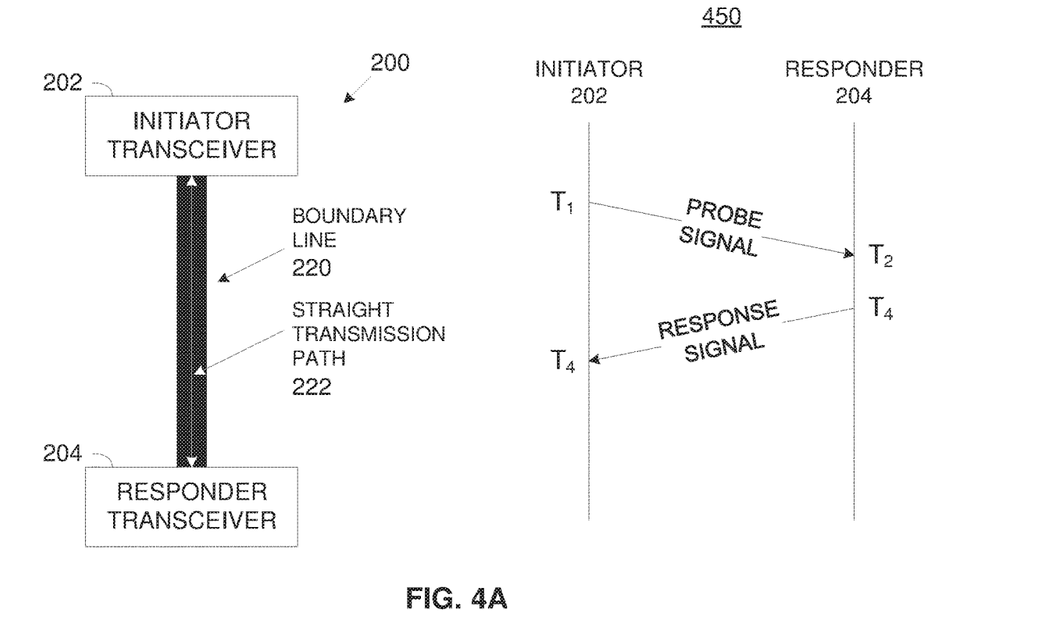
FIGS. 4A and 4B are schematic illustrations of exemplary signal propagation timings measured for signals transmitted by wireless transceivers deployed in a monitored space for a clear and a blocked straight transmission path along a boundary line, according to some embodiments of the present invention.
Figure 4B:
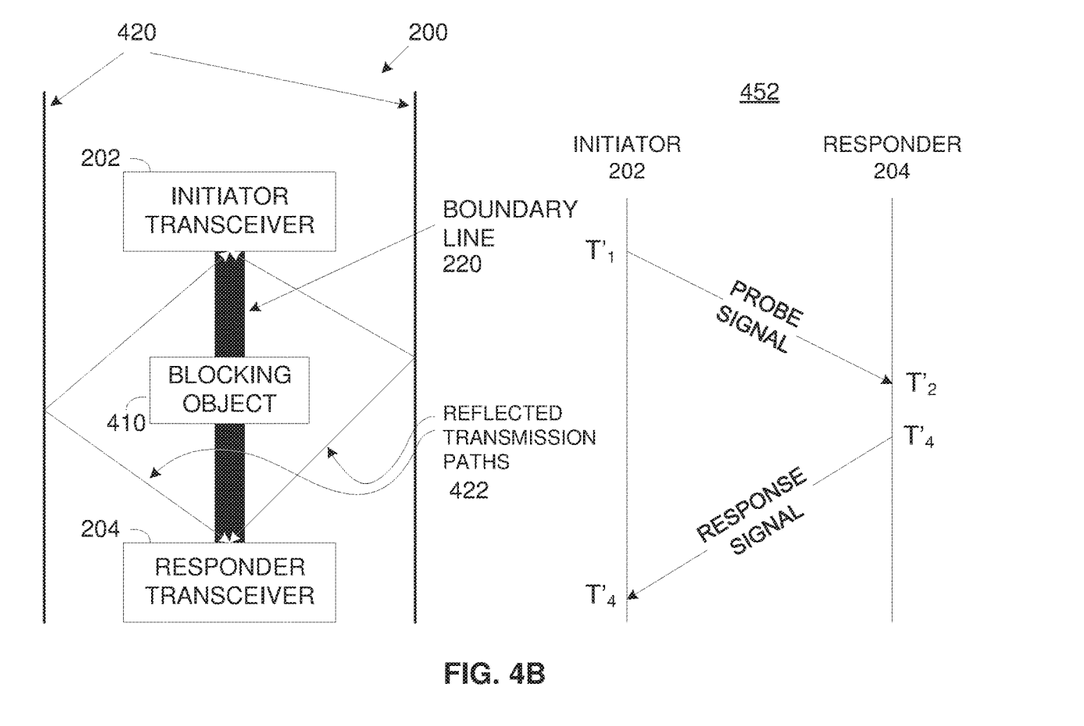

Reference is now made to FIG. 4A and FIG. 4B, which are schematic illustrations of exemplary signal propagation timings measured for signals transmitted by wireless transceivers deployed in a monitored space for a clear and a blocked straight transmission path along a boundary line, according to some embodiments of the present invention.

An initiator wireless transceiver such as the initiator wireless transceiver 202 and a responder wireless transceiver such as the responder wireless transceiver 204 may be deployed in a monitored space such as the monitored space 200. The initiator wireless transceiver 202 and the responder wireless transceiver 204 are deployed to form a boundary line 220 coinciding with a straight transmission path 222 between the initiator wireless transceiver 202 and the responder wireless transceiver 204.

As seen in FIG. 4A, the boundary line 220 is clear of obstacles such that the wireless probe signal(s) and its corresponding wireless response signal(s) may travel along the straight transmission path 222. As seen in illustration 450, the travel time of a wireless probe signal may be expressed by the value $T_2-T_1$ and the travel time of a corresponding wireless response signal may be expressed by the value $T_4-T_3$. The overall RTT which may be used as the reference RTT equals $(T_2-T_1)+(T_4-T_3)$ as formulated in equation 1. Naturally, wireless probe signals and their corresponding wireless response signals which are transmitted while the straight transmission path 22 is clear may substantially equal the reference RTT. In some cases, the computed RTT may deviate slightly from the reference RTT due to one or more environmental conditions existing in the monitored space 200, for example, temperature and/or the like. Such small deviations may be expressed by the predefined small error margin such that in case of deviation which is within the predefined error margin, the initiator wireless transceiver 202 may determine that the straight transmission path 222 is clear and hence the boundary line 220 is clear.

However, as seen in FIG. 4B, an object 410, for example, a person, an animal, a vehicle, a robot, a tool (carried by a mobile object) and/or the like blocking the straight transmission path 222 may cause one or more of the wireless probe signals and/or their corresponding wireless response signals to travel a different path between the initiator wireless transceiver 202 and the responder wireless transceiver 204. For example, the wireless probe signal(s) and/or the wireless response signal(s) may travel along one or more reflected transmission paths 422 in which the wireless signal(s) transmitted from one of the wireless transceivers reach the other wireless transceivers after reflected, deflected and/or bounced from one or more objects 420 located in the monitored space 200. Such reflecting objects 420 may include, for example, walls, furniture, vehicles, people and/or the like. In such case, as seen in illustration 452, the travel time of a wireless probe signal may be expressed by the value $T_2'-T_1'$ and the travel time of the corresponding wireless response signal may be expressed by the value $T_4'-T_3'$. The overall RTT computed according to equation 1 may thus equal $(T_2'-T_1')+(T_4'-T_3')$. Since obviously $(T_2'-T_1')+(T_4'-T_1)>(T_2-T_1)+(T_4-T_3)$, the initiator wireless transceiver 202 may determine that one or more objects 410 are blocking the straight transmission path 222 and thus the initiator wireless transceiver 202 may determine that the object(s) 410 are crossing the boundary line 220.

Optionally, the initiator wireless transceiver 202 initiates one or more operations at a detection of the boundary line crossing. For example, in case of detection of the boundary line crossing the initiator wireless transceiver 202 may generate an alarm indication to inform of a potential intruder. In another example, the in case of detection of the boundary line crossing the initiator wireless transceiver 202 may transmit one or more messages to one or more systems, for example, an access control system, an alarm system and/or the like. In another example, the in case of detection of a potential boundary line crossing the initiator wireless transceiver 202 may attempt to verify the detection by repeating the process 100. The initiator wireless transceiver 202 may thus transmit one or more additional wireless probe signals to the responder wireless transceiver 204 in order to increase certainty of whether the straight transmission path 222 is blocked or not. Moreover, the initiator wireless transceiver 202 may adjust a transmission mode of the additional wireless probe signals, for example, to rapidly transmit a series of additional wireless probe signals in a significantly short time period. The initiator wireless transceiver 202 may then determine whether the boundary line is crossed according to a statistical analysis, for example, averaging of the RTT computed for a plurality of probe signals and their corresponding wireless response signals.

Since the speed of the wireless signals is known (speed of light), the RTT computed for a wireless probe signal and its corresponding wireless response signal of course expresses the cumulative (combined) distance travelled by the wireless probe and response signals. The initiator wireless transceiver 202 may therefore, alternatively and/or additionally, detect the crossing of the boundary line 220 based on a deviation of the cumulative travel distance of a wireless probe signals and its corresponding wireless response signal compared to the length of the boundary line 220 formed between the initiator wireless transceiver 202 and the responder wireless transceiver 204.

Figure 5:
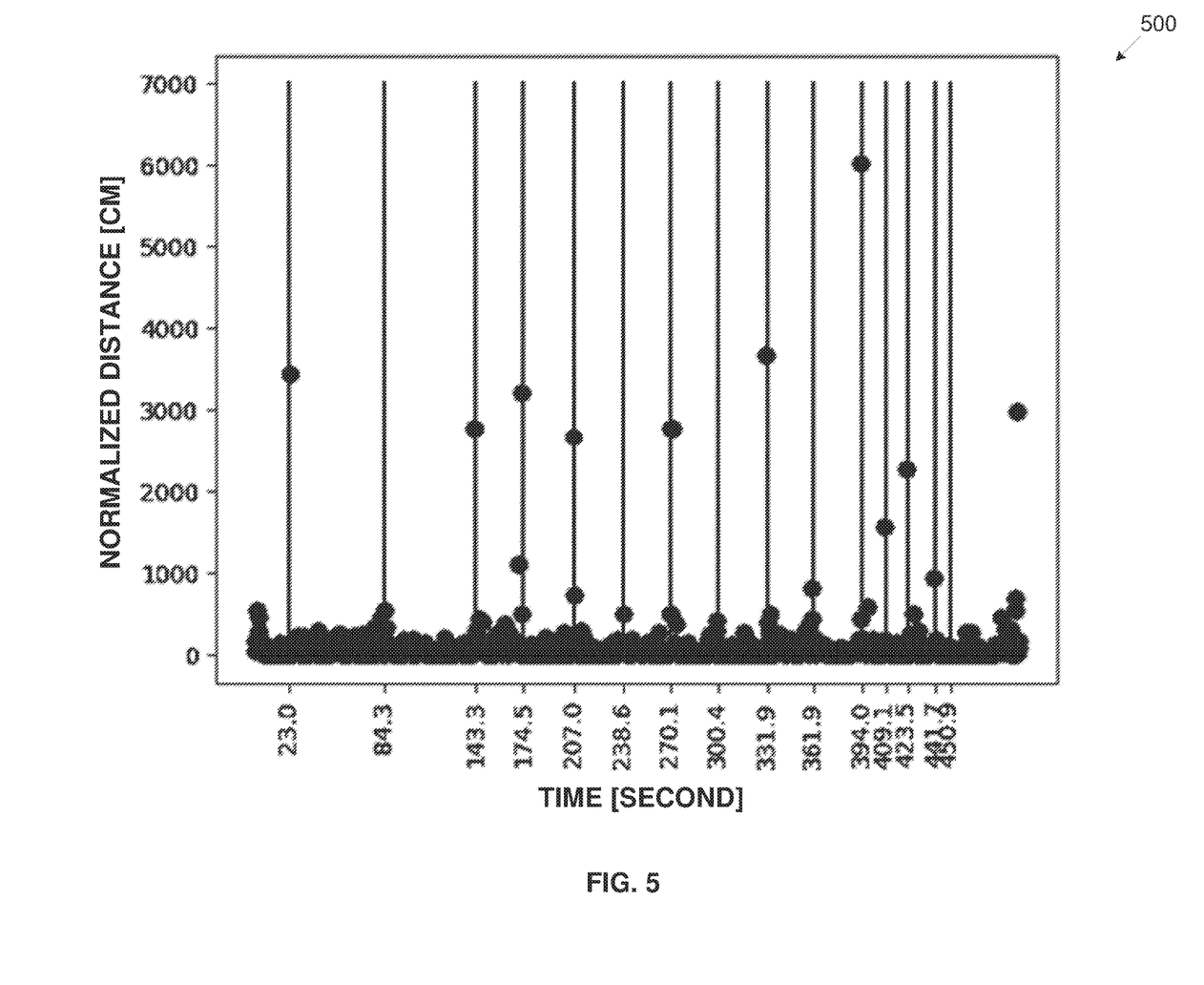
FIG. 5 is a graph chart of an exemplary distribution of distance measurement between wireless transceivers deployed in a monitored space to detect crossing of a boundary line, according to some embodiments of the present invention.

Reference is now made to FIG. 5, which is a graph chart of an exemplary distribution of distance measurement between wireless transceivers such as the initiator wireless transceiver 202 and a responder wireless transceiver such as the responder wireless transceiver 204 deployed in a monitored space such as the monitored space 200 to detect crossing of a boundary line such as the boundary line 220, according to some embodiments of the present invention.

A graph chart 500 presents an exemplary distribution of cumulative distances of a plurality of wireless probe signals and their corresponding wireless response signals transmitted between the initiator the initiator wireless transceiver 202 and the responder wireless transceiver 204.

The X-axis indicates time (seconds) and the Y-axis indicates a normalized distance (centimeters) which is the cumulative distance computed for each pair of wireless probe signal and its corresponding wireless response signal subtracted by the length of the boundary line 220 expressing the straight transmission path 222. Therefore, due to the normalization, the Y value of cumulative travel distances travelled by wireless probe signals and their corresponding wireless response signals along the straight transmission path 222 substantially equals zero.

As evident from the graph chart 500, most of the time the Y value computed for the wireless probe signals and their corresponding wireless response signals is significantly close to zero indicating that these wireless probe signals and their corresponding wireless response travel along the straight transmission path 222. As described herein before this may indicate that the straight transmission path 222 is not blocked and is thus clear of obstacles meaning there is no crossing of the boundary line 220.

However, the Y value computed for wireless probe signals and their corresponding wireless response signals transmitted at certain times, for example, at second, 23.0, at second 84.3, at second 143.3, at second 174.5 among others is significantly high. This means that these wireless probe signals and their corresponding wireless response signals do not travel along the straight transmission path 222 but rather along longer transmission paths such as for example, the reflected transmission paths 422. As described herein before this may indicate that the straight transmission path 222 is blocked by one or more objects such as the object 410 meaning there may be a potential crossing of the boundary line 220.

According to one or more embodiments of the present invention, the initiator wireless transceiver 202 may estimate one or more attributes of an object such as the object 410 blocking the straight transmission path 222 according to a value of the deviation of the computed RTT from the reference RTT.

In particular, the initiator wireless transceiver 202 may estimate one or more attributes of the blocking object 410 according to permittivity of the blocking object 410 estimated based on the deviation value. The permittivity is a measure of capacitance that is encountered when forming an electric field in a certain medium. Martials permittivity is typically expressed by relative permittivity which is a ratio of the material's absolute permittivity relative to vacuum permittivity (1 F/m). The permittivity estimation may be based on the fact that blocking objects 410 constructed and/or containing higher permittivity materials may induce increased blocking of the straight transmission path 222 compared to blocking objects 410 constructed and/or containing lower permittivity materials. For example, concrete may have a relative permittivity value of 6-8. Therefore, half a meter of concrete blocking the straight transmission path 222 may translate to about 3-4 meters of additional travel distance of these wireless probe signals and their corresponding wireless response signals compared to travelling via the air/vacuum with no objects blocking the straight transmission path 222. The additional distance is of course reflected in the RTT computed for these wireless probe signals and their corresponding wireless response signals such that based on the deviation from the reference RTT, the initiator wireless transceiver 202 may determine that the straight transmission path 222 is blocked by a concrete object 410. In another example, organic materials and entities, for example, a person, an animal and/or the like may have a significantly high relative permittivity value which may be around 100 and may translate to a very large additional distance travelled by wireless probe signals and their corresponding wireless response signals travelling through such organic matter. Based on the deviation from the reference RTT, the initiator wireless transceiver 202 may therefore determine that the straight transmission path 222 is blocked by an organic object 410.

The RTT based detection of boundary crossing may of course be expanded to include a plurality of transceiver pairs each comprising an initiator wireless transceiver such as the initiator wireless transceiver 202 and a responder wireless transceiver such as the responder wireless transceiver 204 deployed to form a plurality of straight boundary lines in a various monitored spaces.

Figure 6:
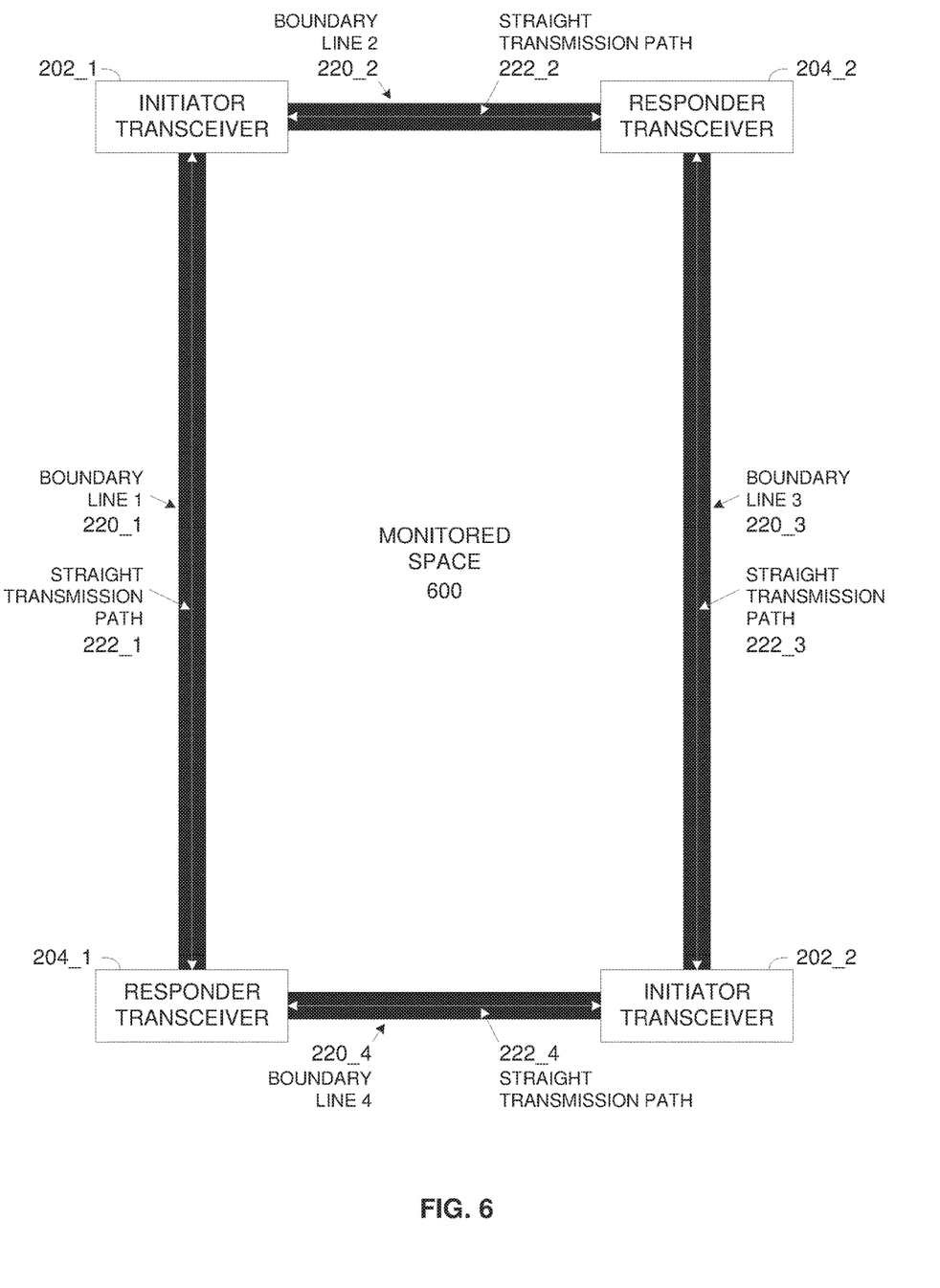
FIG. 6 is a schematic illustration of wireless transceivers deployed in an exemplary monitored space to detect crossing of a perimeter boundary line of the monitored space based on wireless signals travel time measured by wireless transceivers, according to some embodiments of the present invention.

Reference is now made to FIG. 6, which is a schematic illustration of wireless transceivers deployed in an exemplary monitored space to detect crossing of a perimeter boundary line of the monitored space based on wireless signals travel time measured by wireless transceivers, according to some embodiments of the present invention.

An exemplary monitored space 600 may be deployed with two initiator wireless transceivers 202_1 and 202_2 such as the initiator wireless transceiver 202 and two responder wireless transceivers 204_1 and 204_2 such as the responder wireless transceiver 204. In particular, the wireless transceivers 202_1, 202_2, 204_1 and 204_2 may be deployed in the monitored space 600 such that straight transmission paths 222_1, 222_2, 222_3 and 222_4 form boundary lines 220_1, 220_2, 220_3 and 220_4 constituting a perimeter of the monitored space 600.

To this end, each of the two initiator wireless transceivers 202_1 and 202_2 may be coupled with each of the two responder wireless transceivers 204_1 and 204_2 to form respective boundary lines 220 coinciding with the respective straight transmission paths 222. For example, the initiator wireless transceiver 202_1 may be coupled with the responder wireless transceiver 204_1 to form the boundary line 220_1. In another example, the initiator wireless transceiver 202_1 may be coupled with the responder wireless transceiver 204_2 to form the boundary line 220_2. In another example, the initiator wireless transceiver 202_2 may be coupled with the responder wireless transceiver 204_2 to form the boundary line 220_3. In another example, the initiator wireless transceiver 202_2 may be coupled with the responder wireless transceiver 204_1 to form the boundary line 220_4.

Each pair of initiator wireless transceivers 202 and respective responder wireless transceivers 204 may execute independent instances of the process 100 to detect crossing of the respective boundary lines 220. For example, the transceivers pair comprising the initiator wireless transceiver 202_1 and the responder wireless transceiver 204_1 may execute a first instance of the process 100 to detect crossing of the boundary line 220_1. In another example, the transceivers pair comprising the initiator wireless transceiver 202_1 and the responder wireless transceiver 204_2 may execute a second instance of the process 100 to detect crossing of the boundary line 220_2. In another example, the transceivers pair comprising the initiator wireless transceiver 202_2 and the responder wireless transceiver 204_2 may execute a third instance of the process 100 to detect crossing of the boundary line 220_3. In another example, the transceivers pair comprising the initiator wireless transceiver 202_2 and the responder wireless transceiver 204_1 may execute a fourth instance of the process 100 to detect crossing of the boundary line 220_4.

In order to differentiate between wireless probe signals and wireless response signals exchanged between the wireless transceivers 202_1, 202_2, 204_1 and 204_2, each message may be assigned with a unique ID by its originating wireless transceiver such that each wireless response signal may be associated with a respective wireless probe signal. Optionally, the unique ID may identify the originating wireless transceiver which transmitted the respective wireless signal.

The RTT based detection of boundary crossing may be further used for more complex and/or more accurate detection of boundary lines crossing, for example, to detect presence of an object such as the blocking object 410 at a certain monitored point in a certain monitored space, for example, a location of a safe, a location of a valuable art item, an entry point (e.g. door) to a facility, an entry point to an office and/or the like. The RTT based detection of boundary crossing may be applied for such point presence detection by deploying multiple pairs of wireless transceivers such that their straight transmission paths 222 (and hence the respective boundary lines 220) intersect at the monitored point. In such deployments, a simultaneous boundary crossing detected by multiple pairs at the same time may indicate a presence at the monitored point located at the intersection of the plurality straight transmission paths 222.

Figure 7:
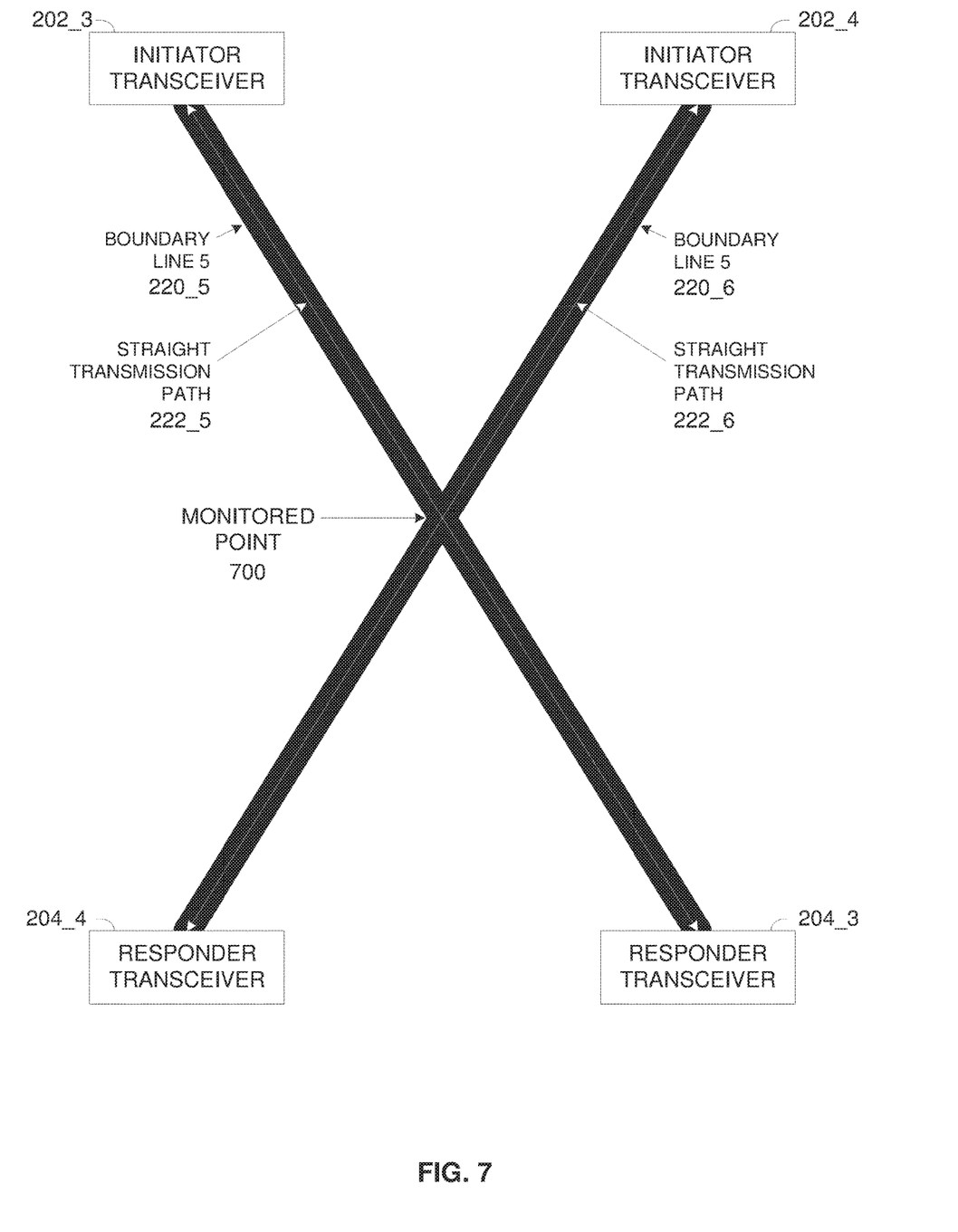
FIG. 7 is a schematic illustration of wireless transceivers deployed in an exemplary monitored space to detect presence of an intruder at a specific location in the monitored space based on wireless signals travel time measured by wireless transceivers, according to some embodiments of the present invention.

Reference is now made to FIG. 7, which is a schematic illustration of wireless transceivers deployed in an exemplary monitored space to detect presence of an intruder at a specific location in the monitored space based on wireless signals travel time measured by wireless transceivers, according to some embodiments of the present invention.

An exemplary monitored point 700 may be monitored by deploying two initiator wireless transceivers 202_3 and 202_4 such as the initiator wireless transceiver 202 and two responder wireless transceivers 204_3 and 204_4 such as the responder wireless transceiver 204. In particular, the wireless transceivers 202_1, 202_2, 204_1 and 204_2 may be deployed such that a straight transmission paths 222_5 between the initiator wireless transceivers 202_3 and the responder wireless transceivers 204_3 intersects with a straight transmission paths 222_6 between the initiator wireless transceivers 202_4 and the responder wireless transceivers 204_4 intersect at the monitored point 700. The intersecting straight transmission paths 222_5 and 222_6 form respective boundary lines 220_5 and 220_6 which may be monitored for crossing.

Whenever one of the initiator wireless transceivers 202_3 and 202_4 detects crossing of the straight transmission paths 222_5 and 222_6 respectively, the respective initiator wireless transceiver 202 may issue a crossing indication. For example, the detecting initiator wireless transceivers 202 may transmit one or more detection message. One or more control systems may receive the detection messages and in case detection messages are received at the same time from both initiator wireless transceivers 202_3 and 202_4, the control system(s) may determine that an object is located at the monitored point 700. Optionally, one of the initiator wireless transceivers 202_3 and/or 202_4 serve as the control system.

Moreover, in order to track the detection messages in time, the initiator wireless transceivers 202_3 and 202_4 may embed a detection timestamp in each detection message. The control system analyzing the received detection messages may use the timestamps to map the detection events in time and identify simultaneous detection by the initiator wireless transceivers 202_3 and 202_4 indicating a blocking object is located at the monitored point 700.

It is expected that during the life of a patent maturing from this application many relevant systems, methods and computer programs will be developed and the scope of the terms wireless communication protocols and timing measurement protocols are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for detecting a boundary line crossing of at least one object based on Round Trip Time (RTT) measured for wireless signals transmitted between two transceivers deployed to form the boundary, comprising:
    a responder wireless transceiver; and
    an initiator wireless transceiver deployed to form a straight boundary line with the responder wireless transceiver, the initiator wireless transceiver is configured to:
        transmit at least one wireless probe signal to the responder wireless transceiver,
        receive a wireless response signal transmitted by the responder wireless transceiver in response to the at least one wireless probe signal,
        calculate an RTT combining a travel time of the at least one wireless probe signal and the travel time of the wireless response signal,
        compare the RTT to a reference RTT computed for a wireless probe signal and a corresponding wireless response signal transmitted in a clear straight transmission path while the boundary line is clear of obstacles, and
        determine whether the at least one object is crossing the straight transmission path based on a deviation of the RTT from the reference RTT.

2. The system of claim 1, further comprising initiating at least one operation in case the straight transmission path is crossed by the at least one object, the at least one operation is a member of a group consisting of: generating an alarm indication, transmitting a message to at least one access control system and adjusting a transmission mode for transmitting at least one additional wireless probe signal.

3. The system of claim 1, wherein the initiator wireless transceiver is configured to continuously transmit a plurality of wireless probe signals and receive corresponding wireless response signals in order to identify the at least one object crossing the boundary line.

4. The system of claim 1, further comprising a plurality of pairs of transceivers are deployed in a monitored space, each of the plurality of transceiver pairs comprising an initiator wireless transceiver and a responder wireless transceiver deployed to form a respective straight boundary line in the monitored space.

5. The system of claim 1, wherein the reference RTT is computed based on at least one calibration transmission transmitted while the straight transmission path is clear of obstacles.

6. The system of claim 1, wherein the reference RTT is computed based on a distance between the initiator wireless transceiver and the responder wireless transceiver, the distance is derived from a structural layout plan of a monitored space in which the initiator wireless transceiver and the responder wireless transceiver are deployed.

7. The system of claim 1, wherein the reference RTT is computed based on a distance between the initiator wireless transceiver and the responder wireless transceiver, the distance is derived from geolocation information received from a geolocation sensor of the initiator wireless transceiver and a geolocation sensor of the responder wireless transceiver.

8. The system of claim 1, wherein the initiator wireless transceiver is further configured to estimate at least one attribute of the at least one object according to permittivity of the at least one object estimated based on a value of the deviation.

9. The system of claim 1, wherein the initiator wireless transceiver and the responder wireless transceiver are IEEE 802.11 transceivers configured to support RTT measurement as defined by IEEE 802.11-2016 specification.

10. The system of claim 9, wherein the initiator wireless transceiver and the responder wireless transceiver are IEEE 802.11 Access Points (AP).

11. The system of claim 9, wherein the at least one wireless probe signal and the corresponding wireless response signal are transmitted according to a Fine Timing Measurement (FTM) protocol according to the IEEE 802.11-2016 specification.

12. A method of detecting a boundary line crossing of an object crossing a boundary line based on Round Trip Time (RTT) measured for wireless signals transmitted between two transceivers deployed to form the boundary, comprising:

using at least one circuitry of an initiator wireless transceiver deployed to form a straight boundary line with a responder wireless transceiver, the at least one circuitry is configured to:

transmit at least one wireless probe signal to the responder wireless transceiver;

receive a wireless response signal transmitted by the responder wireless transceiver in response to the at least one wireless probe signal;

calculate an RTT combining a travel time of the at least one wireless probe signal and the travel time of the wireless response signal;

compare the RTT to a reference RTT computed for a wireless probe signal and a corresponding wireless response signal transmitted in a clear straight transmission path while the boundary line is clear of obstacles; and determine whether the at least one object is crossing the straight transmission path based on a deviation of the RTT from the reference RTT.

13. The method of claim 12, wherein the circuitry is further configured to initiate at least one operation in case the straight transmission path is crossed, the at least one operation is a member of a group consisting of: generating an alarm indication, transmitting a message to at least one access control system and adjusting a transmission mode for transmitting at least one additional wireless probe signal.

14. The method of claim 12, wherein the circuitry is further configured to continuously transmit a plurality of wireless probe signals and receive corresponding wireless response signals in order to identify the at least one object crossing the boundary line.

15. The method of claim 12, wherein the circuitry is further configured to estimate at least one attribute of the at least one object according to permittivity of the at least one object estimated based on a value of the deviation.

* * * * *